United States Patent
Otsuki et al.

(10) Patent No.: US 8,134,593 B2
(45) Date of Patent: Mar. 13, 2012

(54) OUTPUT DEVICE

(75) Inventors: Masaki Otsuki, Yokohama (JP); Satoshi Ejima, Tokyo (JP)

(73) Assignee: Nikon Corporation, Tokyo (JP)

( * ) Notice: Subject to any disclaimer, the term of this patent is extended or adjusted under 35 U.S.C. 154(b) by 373 days.

(21) Appl. No.: 12/311,782

(22) PCT Filed: Nov. 1, 2007

(86) PCT No.: PCT/JP2007/071314
§ 371 (c)(1),
(2), (4) Date: Apr. 13, 2009

(87) PCT Pub. No.: WO2008/062646
PCT Pub. Date: May 29, 2008

(65) Prior Publication Data
US 2010/0020252 A1    Jan. 28, 2010

(30) Foreign Application Priority Data

Nov. 22, 2006  (JP) ................................ 2006-315427
Jul. 20, 2007  (JP) ................................ 2007-189095

(51) Int. Cl.
*H04N 7/18* (2006.01)
*H01H 3/16* (2006.01)

(52) U.S. Cl. ................. 348/115; 200/61.7; 200/61.8 R; 200/61.74

(58) Field of Classification Search ........................ None
See application file for complete search history.

(56) References Cited

U.S. PATENT DOCUMENTS

| 4,794,315 A | * | 12/1988 | Pederson et al. | 320/111 |
| 5,101,504 A | * | 3/1992 | Lenz | 455/78 |
| 5,736,726 A | * | 4/1998 | VanHorn et al. | 235/472.02 |
| 5,861,812 A | * | 1/1999 | Mitchell et al. | 340/636.1 |
| 6,540,375 B1 | * | 4/2003 | Levy et al. | 362/205 |
| 7,542,012 B2 | * | 6/2009 | Kato et al. | 345/8 |

FOREIGN PATENT DOCUMENTS

| JP | A-02-094899 | 4/1990 |
| JP | Y2-7-22955 | 5/1995 |
| JP | A-8-256390 | 10/1996 |

(Continued)

OTHER PUBLICATIONS

Aug. 12, 2011 Office Action issued in JP Application No. 2006-315427 (with English translation).

(Continued)

*Primary Examiner* — John B. Walsh
(74) *Attorney, Agent, or Firm* — Oliff & Berridge, PLC

(57) ABSTRACT

A head band unit contains a bending sensor which detects bending of the head band unit. As shown in the figure, the bending degree of the head band unit when mounted on a user head is smaller than the bending degree of the head band unit when not mounted. Accordingly, the bending degree of the bending sensor is also smaller when mounted. Consequently, by using the output of the bending sensor, it is possible to judge whether the headphone is mounted on the user head. When the headphone is mounted on the user head, power supply to a secondary battery is stopped. Thus, it is possible to provide an output device which can safely charge the secondary battery and can continue operation by an external power source even if the electric capacity of the secondary battery has become zero.

17 Claims, 12 Drawing Sheets

FOREIGN PATENT DOCUMENTS

| | | |
|---|---|---|
| JP | A-10-174187 | 6/1998 |
| JP | A-2001-275260 | 10/2001 |
| JP | A-2002-078056 | 3/2002 |
| JP | A-2003-037886 | 2/2003 |
| JP | A-2004-80679 | 3/2004 |
| JP | A-2004-236242 | 8/2004 |

OTHER PUBLICATIONS

Nov. 18, 2011 Office Action issued in Japanese Patent Application No. 2006-315427 (with translation).

* cited by examiner

FIG. 4A
FIG. 4B
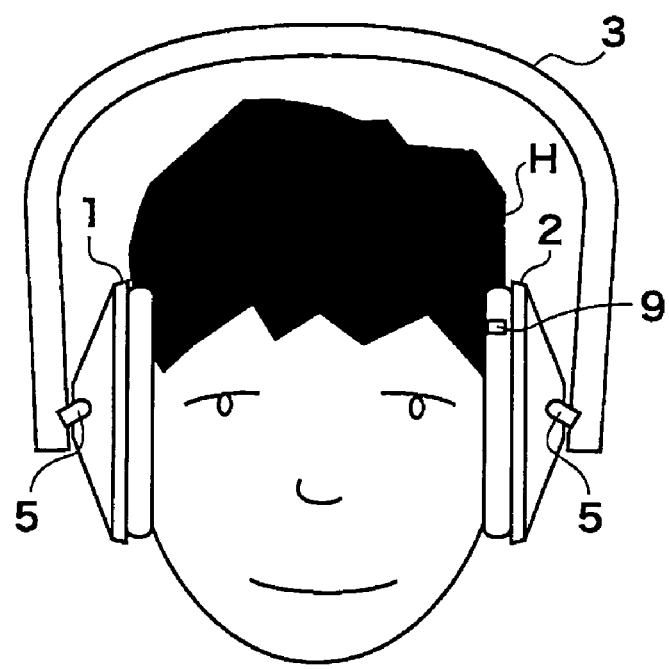
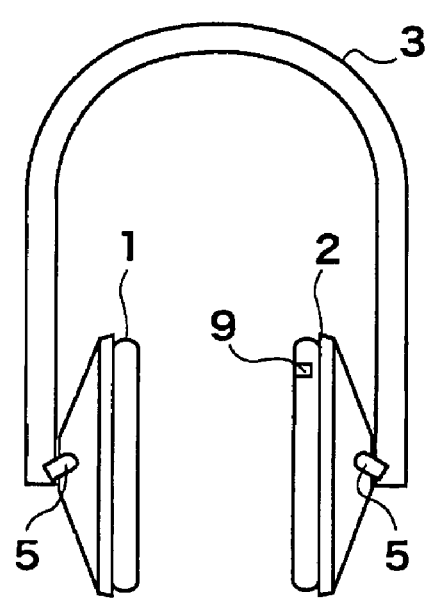

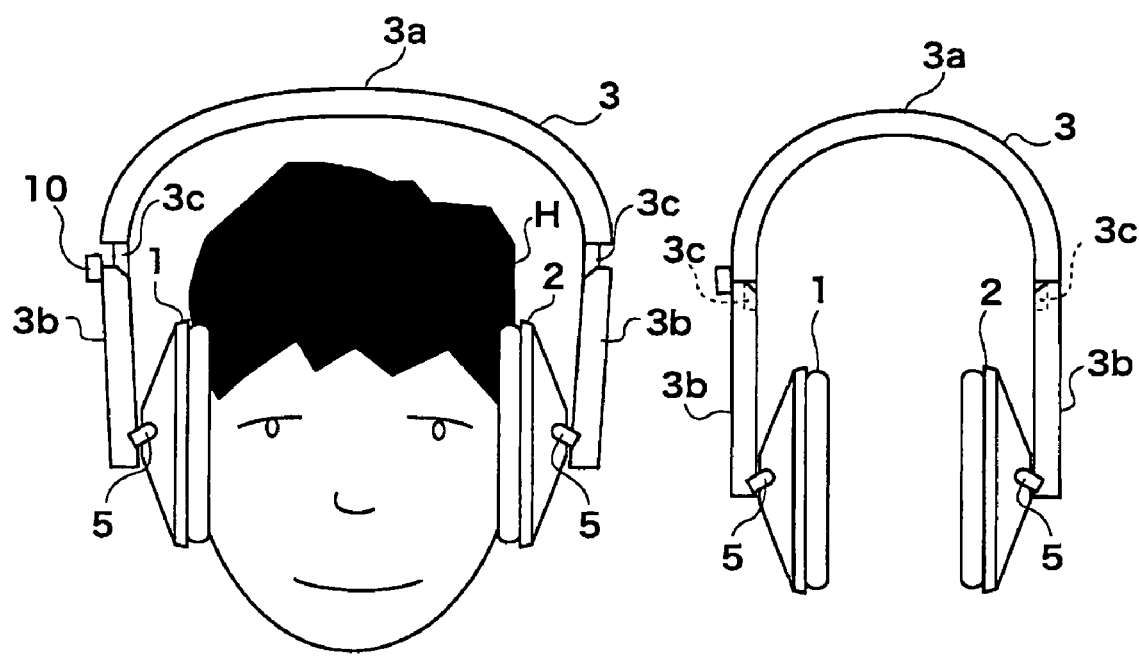

FIG. 7A
FIG. 7B
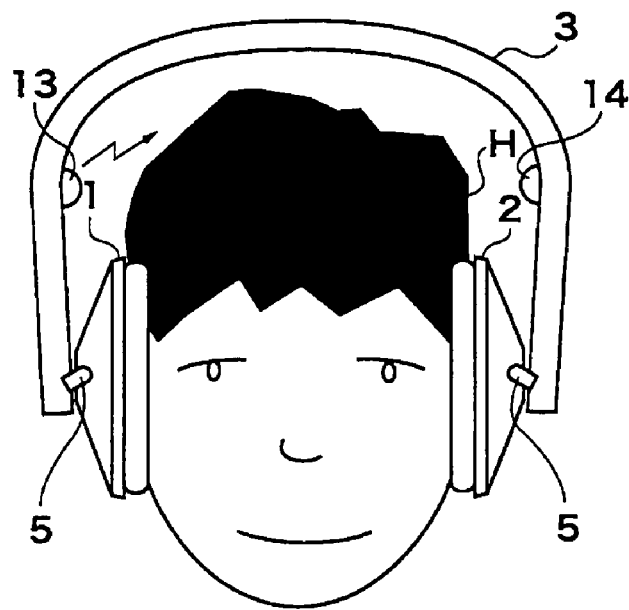
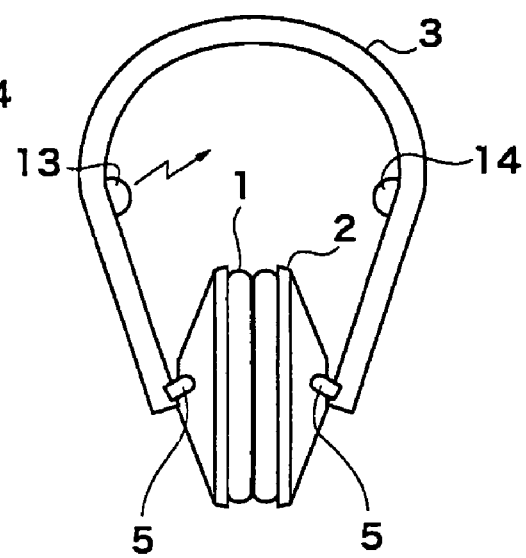

OUTPUT DEVICE

TECHNICAL FIELD

The present invention relates to an output device which is mounted on a head to supply at least one of a video image and a sound.

BACKGROUND ART

In a device such as a wireless headphone and a head-mounted display (for example, see Japanese Patent Application Laid-Open No. 2004-80679 (Patent Document 1)) which is mounted on the head to supply the video image and the sound, electric power is required for the output. A secondary battery such as a lithium-ion battery is frequently used as the electric power of the device. Because a large amount of energy is accumulated in the secondary battery such as the lithium-ion battery, sometimes firing or explosion is generated when usage of the secondary battery is mistaken. In order to prevent generation of such problems, usually a protective circuit or a protective mechanism is provided, and a cautionary statement is added to instructions so as to avoid use of an unregulated battery or an unregulated charging device.

However, there is a risk of generating the problems when a user disregards the cautionary statement and uses an inferior fake battery. Means for not charging the secondary battery while the device such as the wireless headphone and the head-mounted display is mounted on the head is required because the problems such as the firing and the explosion is frequently generated during charging. Therefore, for example, Japanese Utility Model Application Publication No. 7-22955 (Patent Document 2) discloses a structure in which the device cannot be mounted on the head during the charging by providing a charging terminal in a head band unit of the headphone.

Patent Document 1: Japanese Patent application Laid-Open No. 2004-80679
Patent Document 2: Japanese Utility Model application Publication No. 7-22955

DISCLOSURE OF THE INVENTION

Problems to be Solved by the Invention

However, in the technique disclosed in Japanese Utility Model Application Publication No. 7-22955, a terminal for charging and a terminal for power feeding are unified. Accordingly, there is a problem in that an operation of the device cannot be continued by an external power supply when the battery becomes empty.

In view of the foregoing, a problem of the invention is to provide an output device, in which the secondary battery can safely be charged and the operation can be continued by the external power supply even if a capacity of the secondary battery becomes empty, and an output device which can detect that the output device is mounted on the head of the user.

Means for Solving the Problem

A first aspect of the invention is an output device which is mounted on a head to supply at least one of a video image and a sound, wherein the output device including a rechargeable secondary battery which has the output device operate; a charging circuit which charges the secondary battery; and head mounting detection means for detecting that the output device is mounted on the head, wherein the output device has a function of stopping the charging from charging circuit the secondary battery while the head mounting detection means detects that the output device is mounted on the head.

A second aspect of the invention is the output device according to the first aspect including at least two head fixing members which come in contact with the head to fix the output device to the head; and a sandwich member which couples the two head fixing member and sandwiches the head between the head fixing members to fix the output device to the head with a biasing force of the sandwich member, wherein the head mounting detection means detects that the output device is mounted on the head based on an opening angle of the sandwich member.

A third aspect of the invention is the output device according to the first aspect including at least two head fixing members which come in contact with the head to fix the output device to the head; and a sandwich member which couples the two head fixing member and sandwiches the head between the head fixing members to fix the output device to the head with a biasing force of the sandwich member, wherein the head fixing member and the sandwich member are connected by a turning unit or a link mechanism, and the head mounting detection means detects that the output device is mounted on the head based on an angle of the turning unit or the link mechanism.

A forth aspect of the invention is the output device according to the first aspect including at least two head fixing members which come in contact with the head to fix the output device to the head; and a sandwich member which couples the two head fixing member and sandwiches the head between the head fixing members to fix the output device to the head with a biasing force of the sandwich member, wherein the head fixing members have a structure in which the head fixing members do not come in contact with each other when the output device is not mounted on the head, and the head mounting detection means includes a sensor which detects that one of the head fixing members comes in contact with the head, and the head mounting detection means detects that the output device is mounted on the head based on an output of the sensor.

A fifth aspect of the invention is the output device according to the first aspect including at least two head fixing members which come in contact with the head to fix the output device to the head; and a sandwich member which couples the two head fixing member and sandwiches the head between the head fixing members to fix the output device to the head with a biasing force of the sandwich member, wherein the sandwich member includes a first member which comes in contact with a top of the head in mounting the output device on the head; and two second members which are slidably connected to one of side surfaces or both the side surfaces of the sandwich member to retain the head fixing member, and the head mounting detection means detects that the output device is mounted on the head based on distances between the first member and second members.

A sixth aspect of the invention is the output device according to the first aspect including at least two head fixing members which come in contact with the head to fix the output device to the head; and a sandwich member which couples the two head fixing member and sandwiches the head between the head fixing members to fix the output device to the head with a biasing force of the sandwich member, wherein the head fixing member or the sandwich member includes a illuminating unit and a light-receiving unit, the illuminating unit and the light-receiving unit are disposed such that light does not reach the light-receiving unit from the illuminating unit when the output device is mounted on the head, and such that the light reaches the light-receiving unit from the illuminating unit when the output device is not mounted on the head, and the head mounting detection means detects that the output device is mounted on the head based on whether or not the light-receiving unit receives the light.

A seventh aspect of the invention is the output device according to any one of the first aspect to the sixth aspect, wherein whether or not an electric power is supplied to the head mounting detection means is determined independently of whether or not an electric power is supplied to the output device.

An eighth aspect of the invention is an output device which is mounted on a head to supply at least one of a video image and a sound, wherein the output device includes light-emitting means which is provided near one of ears; light-receiving means which is provided near the other ear to be able to receive light from the light-emitting means; and control means for determining whether or not the output device is mounted on a human body including the head based on an output of the light-receiving means.

A ninth aspect of the invention is the output device according to the eighth aspect including first and second head contact means for sandwiching the head; coupling means for coupling the head contact means while biasing the head contact means against the head; and a bending member which folds the coupling means, wherein the light-emitting means and the light-receiving means are disposed such that the light emitted from the light-emitting means is incident to the light-receiving means irrespective of a bending state of the bending member.

A tenth aspect of the invention is the output device according to the eighth aspect or the ninth aspect, wherein the light-emitting means and the light-receiving means are disposed substantially opposite to each other.

A eleventh aspect of the invention is the output device according to any one of the eighth aspect to tenth aspect including reflecting means for reflecting light from the light-emitting means to the light-receiving means.

A twelfth aspect of the invention is the output device according to any one of the eighth aspect to the eleventh aspect including a rechargeable battery; and charging means for charging the rechargeable battery, wherein the control means causes the charging means not to charge the rechargeable battery when determining that the output device is mounted on the human body including the head based on the output of the light-receiving means.

A thirteenth aspect of the invention is the output device according to the twelfth aspect including external power supply means which is connected to the charging means to charge the rechargeable battery.

A fourteenth aspect of the invention is the output device according to the thirteenth aspect, wherein the control means causes the charging means to charge the rechargeable battery when the light-receiving means receives the light from the light-emitting means.

A fifteenth aspect of the invention is an output device which is mounted on a head to supply at least one of a video image and a sound, wherein the output device includes detection means for detecting a state in which the output device is mounted on a human body; a rechargeable battery; charging means for charging the rechargeable battery; and control means for operating the output device with an electric power from the external power supply means when the detection means detects that the output device is mounted on the human body in supplying the electric power from the external power supply means to the charging means, and for causing the external power supply means to charge the rechargeable battery when the detection means does not detect that the output device is mounted on the human body.

A sixteenth aspect of the invention is an output device which is mounted on a head to supply at least one of a video image and a sound, wherein the output device includes coupling means which is mounted on a top of the head of a user; two undeformable coupling units which are coupled to both ends of the coupling means respectively; two head contact means which are respectively connected to the two undeformable coupling units to press right and left sides of the head of the user; light-emitting means which is provided in one of the two undeformable coupling units; light-receiving means which is provided in one of the two undeformable coupling units to be able to receive light from the light-emitting means; and control means for determining whether or not the output device is mounted on a human body based on an output of the light-receiving means.

A seventeenth aspect of the invention is the output device according to the sixteenth aspect, wherein the light-emitting means and the light-receiving means are disposed substantially opposite to each other.

An eighteenth aspect of the invention is the output device according to the sixteenth aspect or the seventeenth aspect including reflecting means for reflecting light from the light-emitting means to the light-receiving means.

A nineteenth aspect of the invention is the output device according to any one of the eighth aspect to the eighteenth aspect, wherein the control means determines whether or not the output device is mounted on the human body only when the external power supply is turned on.

Accordingly, the invention can provide the output device, in which the secondary battery can safely be charged and the operation can be continued by the external power supply even if the capacity of the secondary battery becomes empty, and the output device which can detect that the output device is mounted on the head of the user.

BRIEF DESCRIPTION OF THE DRAWINGS

FIGS. 4A and 4B are views showing an outline of a headphone according to a fourth embodiment of the invention.

FIGS. 5A and 5B are views showing an outline of a headphone according to a fifth embodiment of the invention.

FIGS. 7A and 7B are views showing an outline of a headphone according to a seventh embodiment of the invention.

Figure 1A:
FIGS. 1A and 1B are views showing an outline of a headphone according to a first embodiment of the invention.

EXPLANATIONS OF LETTERS OR NUMERALS 1 ear pad unit
2 ear pad unit
3 head band unit
3*a* top of head
3*b* side of head
4 bending sensor
5 turning unit
6 switch
7 link mechanism
8 link mechanism
9 proximity switch
10 proximity switch
13 illuminating device
14 light receiving device
H head
21 and 22 headphone unit (head contact means)
27 and 28 inelastic deformation unit (undeformable coupling unit)
29 head band unit (coupling means)
29*a* hinge (bending member)
30 display unit (display means)
37 light-emitting unit (light-emitting means)
38 light-receiving unit (light-receiving means)
50 control unit (control means)
51 main CPU
52 sub-CPU
61 charging circuit (charging means)
63 battery (rechargeable battery)
64 external power supply (external power supply means)

BEST MODES FOR CARRYING OUT THE INVENTION

Figure 1B:
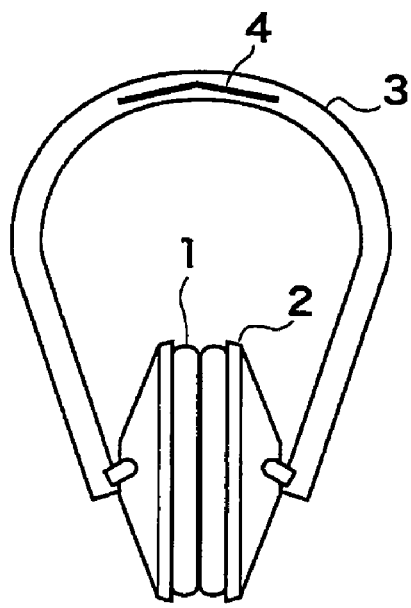

Embodiments of the invention will be described below with reference to the drawings. FIGS. 1A and 1B are views showing an outline of a headphone according to a first embodiment of the invention. The headphone includes ear pad units 1 and 2. The ear pad units 1 and 2 are of the head fixing members which come in contact with a head H to fix the headphone to the head. Speakers are incorporated in the ear pad units 1 and 2 to supply the sounds, respectively. The two ear pad units 1 and 2 are coupled by a head band unit 3. The head band unit 3 has an elastic force, and the head band unit 3 imparts a biasing force such that the ear pad units 1 and 2 are brought close to each other. Therefore, in cases where the headphone is mounted on the head H, as shown in FIG. 1A, the head band unit 3 is pushed outward, and the ear pad units 1 and 2 are pressed against the head H by a reactive force of the head band unit 3, thereby fixing the headphone to the head H. During nonuse of the headphone, as shown in FIG. 1B, the ear pad units 1 and 2 come in contact with each other by the biasing force of the head band unit 3.

A bending sensor 4 is provided in the head band unit 3 in order to detect bending of the head band unit 3. In the bending sensor 4, two piezoelectric sensors are bonded into a bimetal shape, one of the piezoelectric sensors is stretched while the other piezoelectric sensor is compressed in the bending, and outputs of the piezoelectric sensors are detected to measure the bending.

As can be seen from FIGS. 1A and 1B, the bending of the head band unit 3 in mounting the headphone on the head H is smaller than the bending during the nonuse of the headphone, and therefore the bending of the bending sensor 4 becomes smaller in mounting the headphone on the head H. Accordingly, whether or not the headphone is mounted on the head H can be determined when the output of the bending sensor 4 is observed.

A secondary battery (not shown) is incorporated in the headphone. When the headphone is mounted on the head H, a control circuit opens a charging circuit to the secondary battery so as not to charge the secondary battery. Electric power is supplied to other portions of the headphone irrespective of the charging. Therefore, in the event that an inferior fake battery is used, the risk of generating the firing or explosion is eliminated in mounting the headphone on the head. Additionally, even if the secondary battery becomes empty, the operation of the headphone can be continued because the electric power is supplied to other portions of the headphone.

Figure 2A:
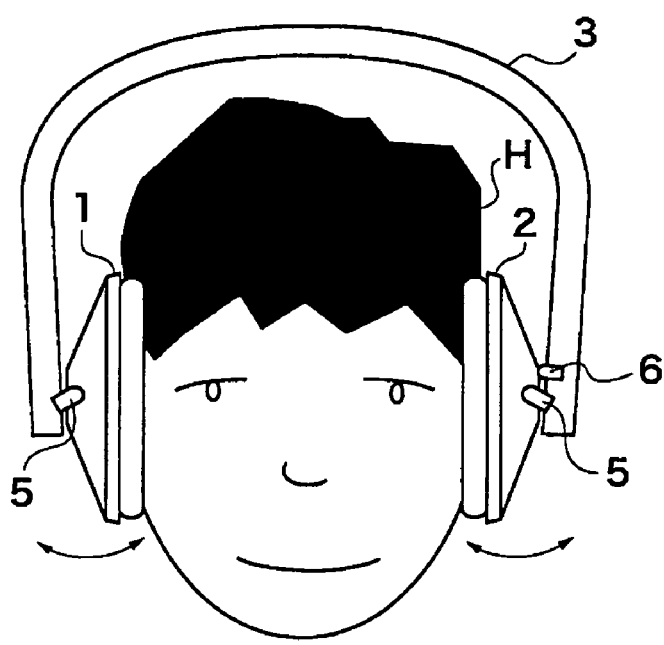
FIGS. 2A and 2B are views showing an outline of a headphone according to a second embodiment of the invention.
Figure 2B:
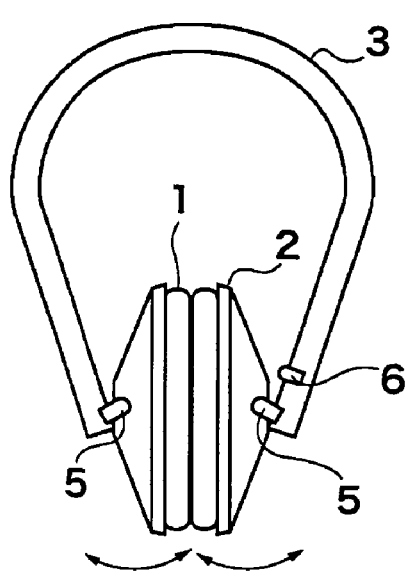

FIGS. 2A and 2B are views showing an outline of a headphone according to a second embodiment of the invention. In the following drawings, the same component as that shown in the above-described drawings is designated by the same numeral, and sometimes the description will not be repeated. In the second embodiment, the ear pad units 1 and 2 and the head band unit 3 are joined by a turning unit 5, and the ear pad units 1 and 2 can be turned with respect to the head band unit 3 as shown by arrows of FIGS. 2A and 2B.

A switch 6 such as a limit switch and a proximity switch is provided in the head band unit 3. When the ear pad unit 2 is turned and brought close to the head band unit 3, the switch 6 can detect the proximity between the ear pad unit 2 and the head band unit 3. In FIG. 2A showing the state in which the headphone is mounted on the head H, the ear pad unit 2 and the head band unit 3 are brought close to each other, and an output of the switch 6 is ON. In FIG. 2B showing the state in which the headphone is not mounted on the head H, the output of the switch 6 is OFF because the ear pad unit 2 is turned counterclockwise and moved away from the head band unit 3. Therefore, whether or not the headphone is mounted on the head H can be found out.

Thus, the switch 6 detects an angle of the turning unit 5 to detect whether or not the headphone is mounted on the head H. The turning angle of the turning unit can directly be detected. Alternatively, the angle of the turning unit can also be detected using the switch and the like as described above. Other actions of the second embodiment are similar to those of the first embodiment.

Desirably the biasing force is applied to the turning unit 5 such that the turning unit 5 is turned in a predetermined direction. Generally, the human head has a shape in which a lower side of the head is narrowed. Accordingly, the biasing force is desirably applied such that the ear pad unit 1 is turned clockwise while the ear pad unit 2 is turned counterclockwise. With the mechanism described above, when the headphone is mounted on the head H, the ear pad units 1 and 2 are turned against the biasing force to mount the headphone on the head, such that the ear pad unit 2 can securely be brought close to the switch 6 in mounting the headphone on the head H, and such that the ear pad unit 2 can securely be moved away from the switch 6 in not mounting the headphone on the head H.

Figure 3A:
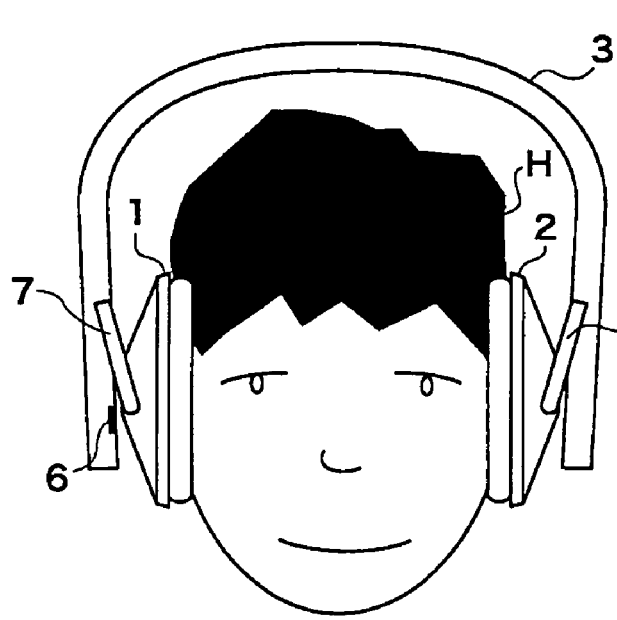
FIGS. 3A and 3B are views showing an outline of a headphone according to a third embodiment of the invention.
Figure 3B:
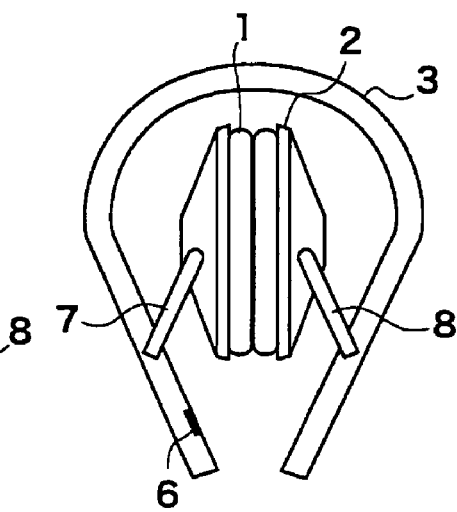

FIGS. 3A and 3B are views showing an outline of a headphone according to a third embodiment of the invention. In the headphone of the third embodiment, the ear pad units 1 and 2 are joined to the head band unit 3 by link mechanisms 7 and 8, respectively. The headphone can be accommodated while folded as shown in FIG. 3B in not mounting the headphone on the head H.

In the third embodiment, the switch 6 such as the limit switch and the proximity switch is provided in an end face of the head band unit 3. When the link mechanism 7 is turned to bring the ear pad unit 1 close to the end face of the head band unit 3, the switch 6 can detect a magnetic force of the speaker of the ear pad unit 1. In FIG. 3A showing the state in which the headphone is mounted on the head H, the switch 6 provided in the head band unit 3 and the ear pad unit 1 are brought close to each other, and the output of the switch 6 is ON. In FIG. 3B showing the state in which the headphone is not mounted on the head H, the output of the switch 6 is OFF because the link mechanism 7 is turned counterclockwise to move the ear pad unit 1 away from the head band unit 3. Therefore, whether or not the headphone is mounted on the head can be found out. Instead of detecting the magnetic force, the switch 6 may be activated by the contact with the ear pad unit 1.

Thus, the switch 6 detects a position of the link mechanism 7 to detect whether or not the headphone is mounted on the head. In order to detect the position of the link mechanism 7, the angle of the turning unit can directly be detected. Alternatively, the position of the link mechanism 7 can also be detected using the switch and the like as described above. Other actions of the third embodiment are similar to those of the first embodiment.

FIGS. 4A and 4B are views showing an outline of a headphone according to a fourth embodiment of the invention. In the forth embodiment, a proximity switch 9 is provided in order to detect the proximity between the head band unit 3 and the head H. When the proximity switch 9 is brought close to the head H, the output of the proximity switch 9 is ON.

In FIG. 4A showing the state in which the headphone is mounted on the head H, because the head H and the proximity switch 9 are brought close to each other, the output of the proximity switch 9 is ON. In FIG. 4B showing the state in which the headphone is not mounted on the head H, the output of the proximity switch 9 is OFF because the head H is not located in the proximity of the proximity switch 9. Therefore, whether or not the headphone is mounted on the head can be found out. Other actions of the fourth embodiment are similar to those of the first embodiment.

FIGS. 5A and 5B are views showing an outline of a headphone according to a fifth embodiment of the invention. In the fifth embodiment, the head band unit 3 is divided into a top of head 3a and sides of head 3b, and distances between the top of head 3a and the sides of head 3b can be adjusted by a sliding units 3c. A proximity switch 10 is provided in the side of head 3b, and the proximity switch 10 is made ON when the top of head 3a is separated from the side of head 3b.

In FIG. 5A showing the state in which the headphone is mounted on the head H, the output of the proximity switch 10 is ON because the top of head 3a and the side of head 3b are separated from each other. In FIG. 5B showing the state in which the headphone is not mounted on the head H, the output of the proximity switch 10 is OFF because the top of head 3a and the side of head 3b are brought close to each other. Therefore, whether or not the headphone is mounted on the head can be found out. Other actions of the fifth embodiment are similar to those of the first embodiment.

Desirably the biasing force is applied between the top of head 3a and the sides of head 3b such that the top of head 3a and the sides of head 3b are brought close to each other. With the mechanism described above, the top of head 3a and the side of head 3b can securely be separated from each other in mounting the headphone on the head H, and the top of head 3a and the side of head 3b can securely be brought close to each other in not mounting the headphone on the head H.

Figure 6A:
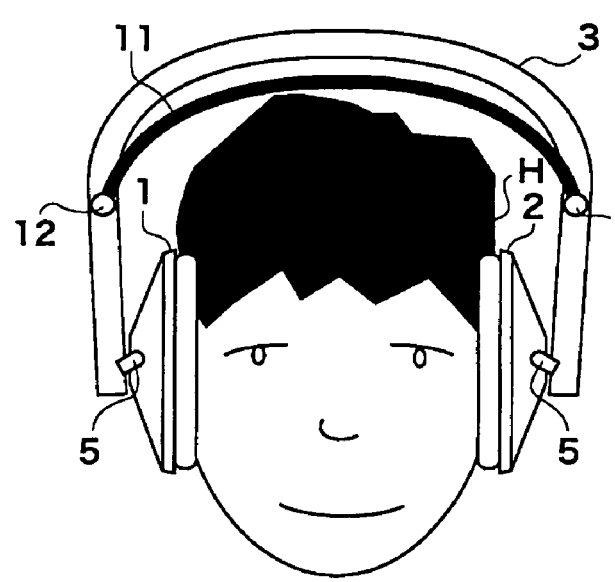
FIGS. 6A and 6B are views showing an outline of a headphone according to a sixth embodiment of the invention.
Figure 6B:
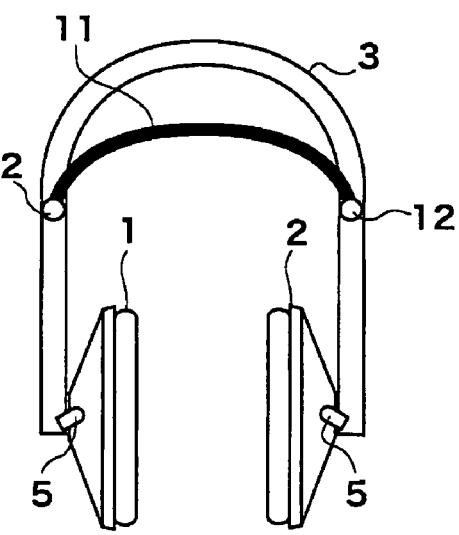

FIGS. 6A and 6B are views showing an outline of a headphone according to a sixth embodiment of the invention. In the sixth embodiment, a band 11 is provided, and the band 11 is wound by winding mechanisms 12. As shown in FIG. 6A, in mounting the headphone on the head H, the band 11 comes in contact with the head H, and the band 11 is drawn against a winding force of the winding mechanisms 12. In not mounting the headphone on the head H, the band 11 becomes short because band 11 is wound by the winding mechanisms 12. Therefore, when a winding amount sensor is provided in the winding mechanism 12, whether or not the headphone is mounted on the head can be found out by the output of the winding amount sensor. Other actions of the sixth embodiment are similar to those of the first embodiment.

FIGS. 7A and 7B are views showing an outline of a headphone according to a seventh embodiment of the invention. In the seventh embodiment, a illuminating device 13 is provided inside one of the sides of the head band unit 3, and a light receiving device 14 is provided inside the other side of the head band unit 3. As shown in FIG. 7A, in mounting the headphone on the head H, light emitted from the illuminating device 13 provided on one of the sides of the head band unit 3 is interrupted by the head H, and the light does not reach the light receiving device 14 provided on the other side of the head band unit 3. As shown in FIG. 7B, in not mounting the headphone on the head H, the light receiving device 14 receives the light emitted from the illuminating device 13. Therefore, whether or not the headphone is mounted on the head H can be found out by the output of the light receiving device 14. Other actions of the seventh embodiment are similar to those of the first embodiment. Alternatively the light emitted from the illuminating device 13 may be modulated and used as a light signal. Influence of ambient lights can be reduced by demodulating the signal.

In the seventh embodiment, whether or not the headphone is mounted on the head is detected by detecting whether or not the emitted light is interrupted by the head. Alternatively, the illuminating device and the light receiving device are disposed on the same side with respect to the head, and whether or not the headphone is mounted on the head may be detected by detecting the light reflected from the head.

Figure 8:
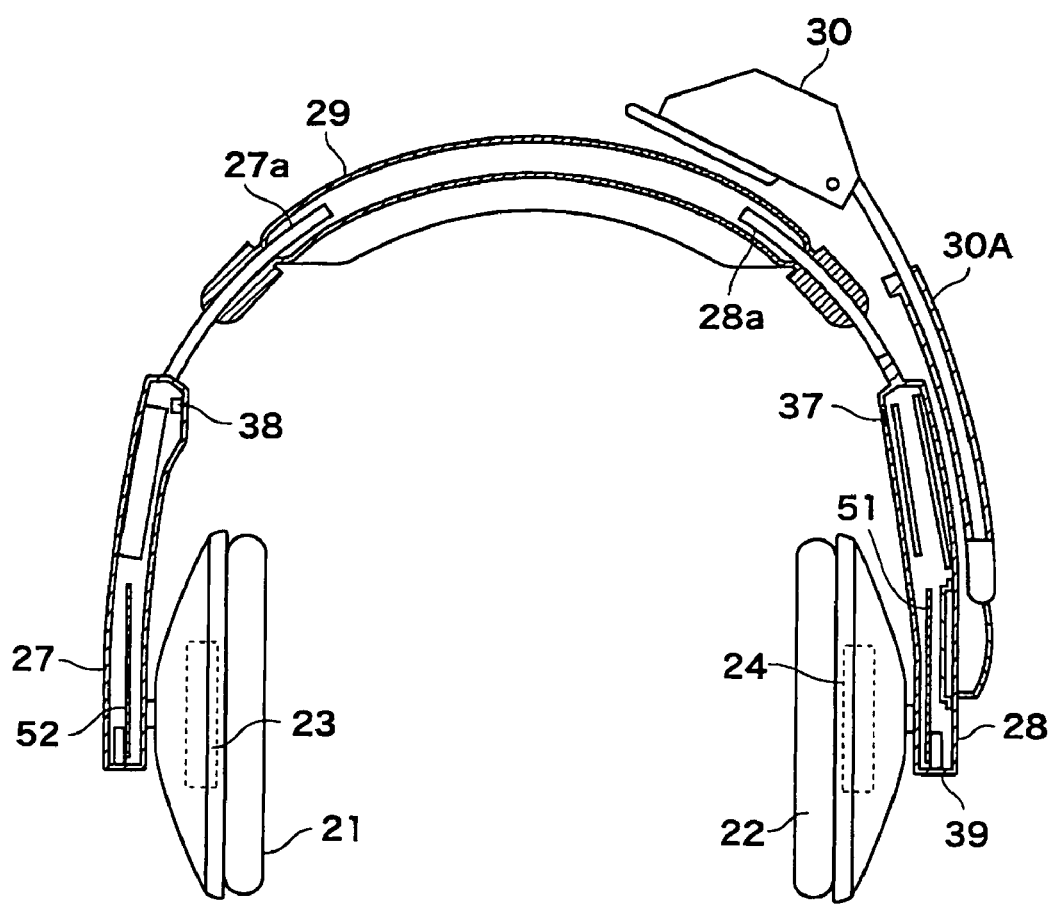
FIG. 8 is a longitudinal sectional view showing a head-mounted display device according to an eighth embodiment of the invention.

FIG. 8 is a longitudinal sectional view showing a head-mounted display device according to an eighth embodiment of the invention. However, in FIG. 8, headphone units (head contact means) 21 and 22 and a display unit 30 are not shown by the cross section.

The head-mounted display device (output device) includes a head band unit (coupling means) 29, inelastic deformation units (undeformable coupling units) 27 and 28, and the display unit (display means) 30. The head band unit 29 has an arc shape, and the head band unit 29 is mounted on the top of head of the user.

The inelastic deformation unit 27 is provided in one of end portions of the head band unit 29, and the inelastic deformation unit 28 is provided in the other end portion of the head band unit 29. A leading end portion of a shaft portion 27a supported by the inelastic deformation unit 27 is movably inserted in one of end portions of the head band unit 29, and a leading end portion of a shaft portion 28a supported by the inelastic deformation unit 28 is movably inserted in the end portion of the head band unit 29. A light-emitting unit (light-emitting means) 37, a main CPU 51, a connection port (USB) 39, and the like are provided in the inelastic deformation unit 28. A light-receiving unit (light-receiving means) 38, a sub-CPU 52, and the like are accommodated in the inelastic deformation unit 27.

The light-emitting unit 37 and the light-receiving unit 38 substantially opposite to each other. When the head-mounted display device is mounted on the head, the light emitted from the light-emitting unit 37 is interrupted by the head, and the light does not reach the light-receiving unit 38. On the other hand, when the head-mounted display device is not mounted on the head, the light-receiving unit 38 receives the light emitted from the light-emitting unit 37. Accordingly, whether or not the headphone is mounted on the head can be found out by the output of the light-receiving unit 38.

The headphone units 21 and 22 to be mounted on the right and left ears of the user are provided in the inelastic deformation units 27 and 28, respectively. The headphone units 21 and 22 press the right and left sides of the head of the user by the elastic force of the head band unit 29. Speakers 23 and 24 are incorporated in the headphone units 21 and 22 to supply sounds, respectively. A battery (rechargeable battery) 63 (see FIG. 9) and the like are accommodated in the headphone unit 21.

The main CPU 51 and the sub-CPU 52 constitute control means for determining whether or not the head-mounted display device is mounted on the head and for controlling a charging operation of the battery 63. The display unit 30 is provided in a leading end portion of a display arm 30A, and the display unit 30 is disposed in front of a left eye of the user. For example, the display unit 30 is formed by a liquid crystal display panel.

Figure 9:
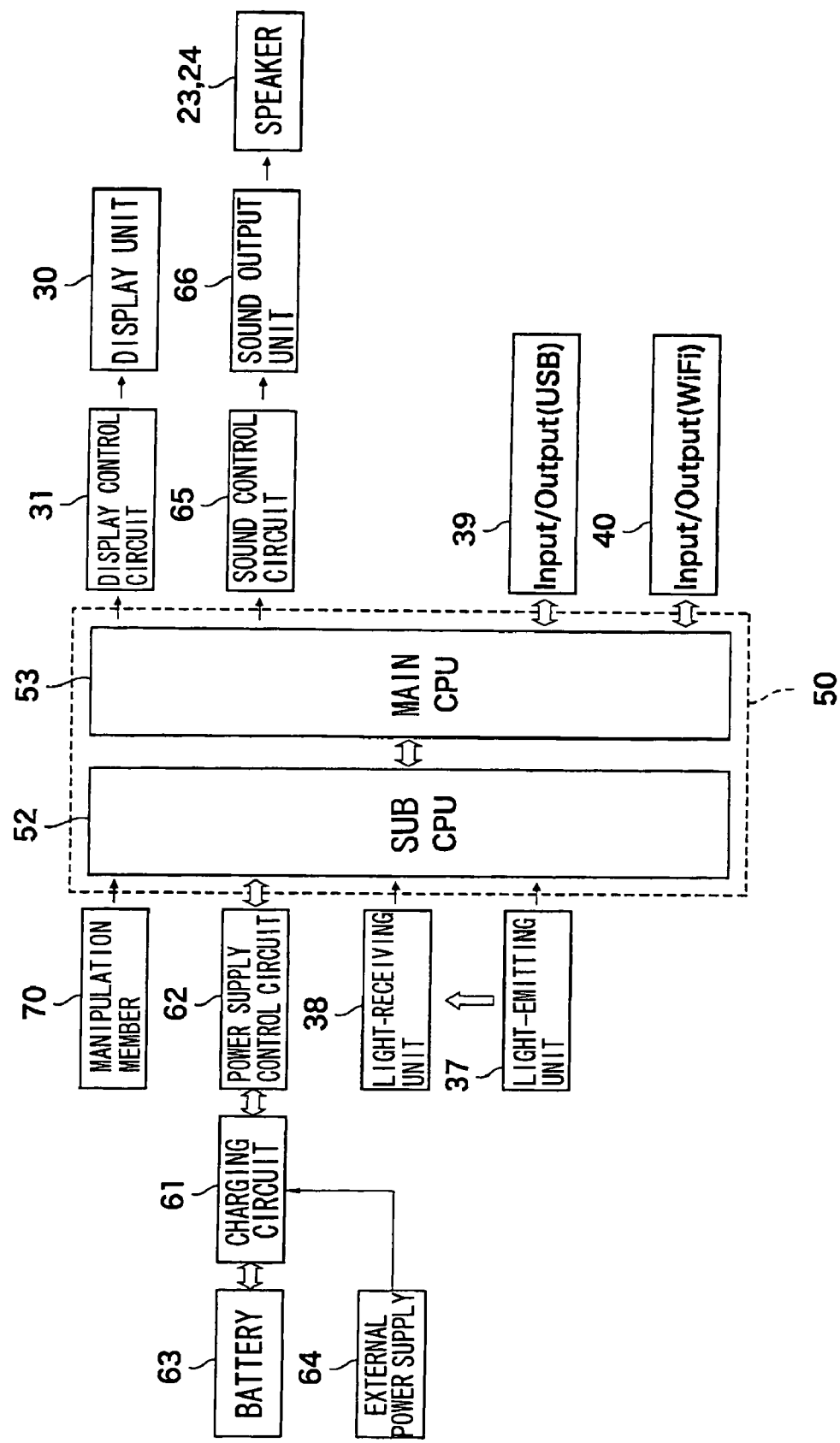
FIG. 9 is a block diagram of the head-mounted display device.

FIG. 9 is a block diagram of the head-mounted display device. The head-mounted display device includes the battery 63, the display unit 30, the light-emitting unit 37, the light-receiving unit 38, and a control unit (control means and control means) 50. The battery 63 is a secondary battery which is rechargeable by an external power supply (external power supply means) 64. Examples of the battery 63 include a lithium-ion battery and a nickel-hydrogen battery.

For example, a light-emitting diode is used as the light-emitting unit 37. For example, a photodiode is used as the light-receiving unit 38, the signal received by the light-receiving unit 38 is amplified, detected, wave-shaped, and supplied to the sub-CPU 52. The display unit 30 is connected to the control unit 50 through a display control circuit 31.

When a manipulation member 70 is manipulated, the control unit 50 supplies a control signal to the display control circuit 31, and the display control circuit 31 lights the display unit 30. The display unit 30 is turned off when the manipulation member 70 is manipulated while the display unit 30 is lit.

The control unit 50 is connected to the battery 63 through a charging circuit (charging means) 61 and a power supply control circuit 62. The control unit 50 controls the power supply control circuit 62 based on the output of the light-receiving unit 38. Electric power is supplied to the components except for the battery 63 irrespective of whether the headphone unit 21 is mounted on the head of the user.

The headphone unit speakers are connected to the control unit 50 through a sound control circuit 65 and a sound output unit 66, and a volume is controlled based on the manipulation of the manipulation member 70, for example. A connection port (USB) 39 and a connection port (WiFi) 40 are provided in the control unit 50. The connection port (USB) 39 is used to connect a peripheral device such as a digital camera and a digital video camera to the head-mounted display device. The connection port (WiFi) 40 is used to perform the wireless LAN.

Figure 10:
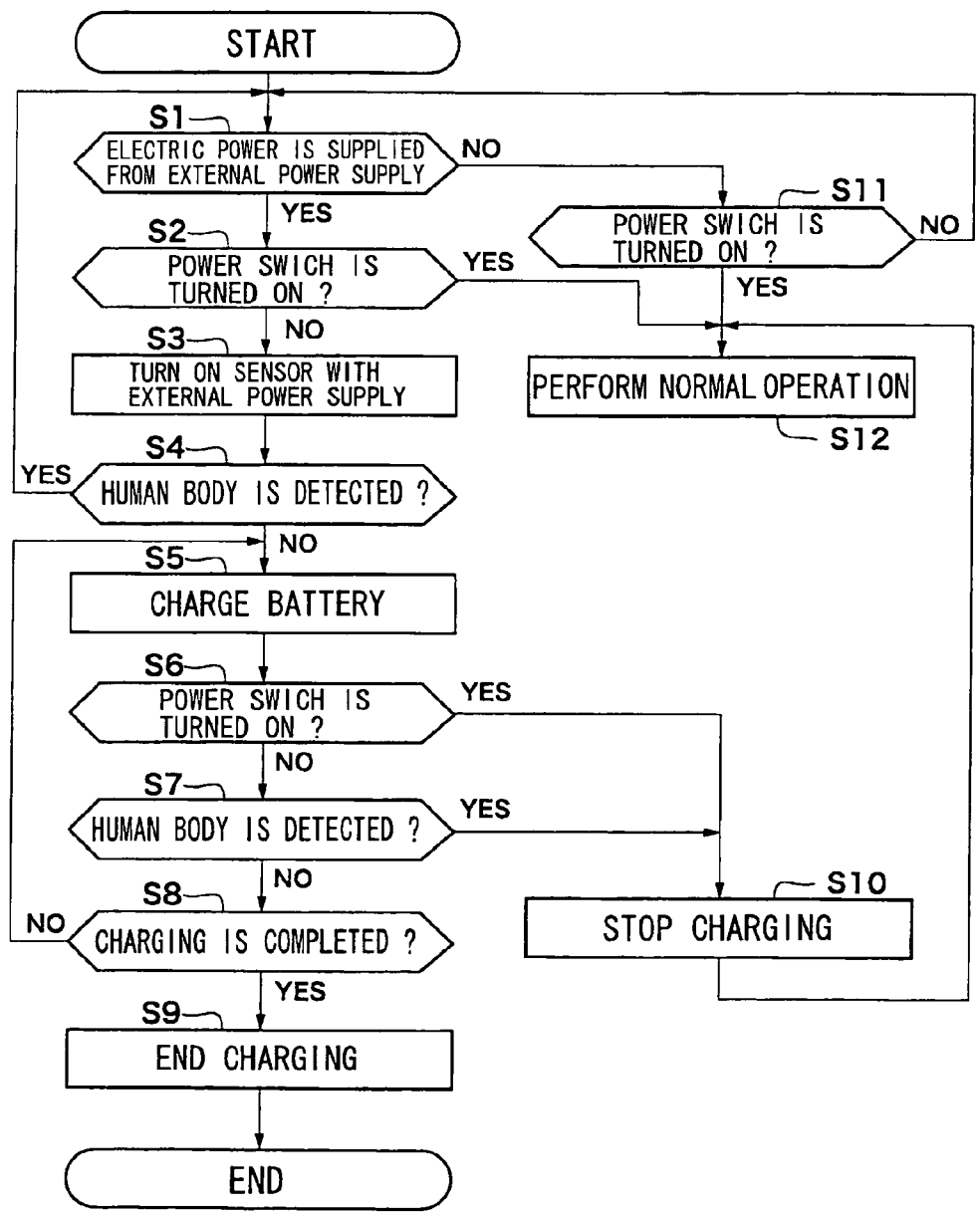
FIG. 10 is a flowchart explaining a behavior of the head-mounted display device.

Operation of the head-mounted display device will be described with reference to FIG. 10. FIG. 10 is a flowchart explaining the operation of the head-mounted display device. In FIG. 10, each of the numerals S1 to S12 designates a step of the operation.

First it is determined whether or not the electric power is supplied from the external power supply 64 (Step S1). When the electric power is supplied from the external power supply 64 (YES in Step S1), it is determined whether or not the user manipulates the manipulation member 70 to turn on the power switch (Step S2). When the power switch is turned off (NO in Step S2), the external power supply 64 is used to turn on the light-emitting unit 37 (sensor) (Step S3). When the power switch is turned on (YES in Step S2), a normal operation (the video image or the sound is supplied) is performed (Step S12).

It is determined whether or not the head (human body) is detected (Step S4). When the head is detected (YES in Step S4), the flow returns to Step S1, and the battery 63 is not charged. When the head is not detected (NO in Step S4), the battery 63 is charged (Step S5).

It is determined whether or not the power switch is turned on (Step S6). When the power switch is turned on (YES in Step S6), the charging is stopped (Step S10), and the normal operation is performed (Step S12). When the power switch is turned off (NO in Step S6), it is determined whether or not the head is detected (Step S7). When the head is not detected (NO in Step S7), it is determined whether or not the charging is completed (Step S8). When the charging is not completed (NO in Step S8), the flow returns to Step S5. When the charging is completed (YES in Step S8), the charging is ended (Step S9).

When the head is detected (YES in Step S7), the charging is stopped (Step S10), and the normal operation is performed (Step S12). When the electric power is not supplied from the external power supply 64 (NO in Step S1), it is determined whether or not the power switch is turned on (Step S11). When the power switch is turned on (YES in Step S11), the normal operation is performed (Step S12). When the power switch is turned off (NO in Step S11), the flow returned to Step S1.

Accordingly, in the eighth embodiment, whether or not the head-mounted display device is mounted on the head can be determined by the output of the light-receiving unit 38 which receives the light from the light-emitting unit 37 provided in the inelastic deformation unit 28. Because the light-emitting unit 37 and the light-receiving unit 38 substantially opposite to each other, an object located between the light-emitting unit 37 and the light-receiving unit 38 can securely be detected (for example, even if the head-mounted display device is placed on a neck of the user, the neck located between the light-emitting unit 37 and the light-receiving unit 38 can be detected). When the determination that the head-mounted display device is mounted on the head is made based on the output of the light-receiving unit 38, the battery 63 is not charged, so that the firing or explosion of the battery 63 can be prevented in mounting the head-mounted display device on the head of the user. When the battery 63 is not turned on, the light-emitting unit 37 and the light-receiving unit 38 are turned on by the external power supply 64, and the head is detected, so that the battery 63 can be prevented from being exhausted.

When the light-receiving unit 38 receives the light (when the head-mounted display device is not mounted on the head of the user), the battery 63 is charged, so that the safety of the user can be ensured. When the light-receiving unit 38 receives the light, the battery 63 is turned off after the charging of the battery 63 is completed, so that the electric power necessary to use the head-mounted display device can be accumulated in the battery 63. When the head is detected, the charging is not performed. Therefore, operation of switching between the charging mode and a mode in which the display unit 30 is used can be eliminated even if the current is supplied through USB.

In the eighth embodiment, the light-emitting unit 37 is provided in the elastic deformation unit 28 while the light-receiving unit 38 in the elastic deformation unit 27. Alternatively, the light-emitting unit 37 and the light-receiving unit

38 may be provided in the elastic deformation unit 28, and a reflector (not shown) which is of reflection means is provided in the elastic deformation unit 27. When the head-mounted display device is mounted on the head, the light emitted from the light-emitting unit 37 is interrupted by the head, and the light does not reach the reflector. On the other hand, when the head-mounted display device is not mounted on the head, the light emitted from the light-emitting unit 37 is reflected by the reflector, and the light-receiving unit 38 receives the light. Accordingly, whether or not the head-mounted display device is mounted on the head can be found out by the output of the light-receiving unit 38.

In the embodiment, it is detected whether or not the head-mounted display device is mounted on the head. Similarly to the head, an arm of the user can be detected even if the head-mounted display device is placed on the arm of the user.

In the embodiment, the head-mounted display device is used as the output device. For example, the headphone can also be used as the output device instead of the head-mounted display device.

Whether or not the head-mounted display device is mounted on the head is optically detected in the embodiment. Alternatively, a pressure sensor (detection means) is provided in the headphone unit 21 facing the headphone unit 22, and whether or not the head-mounted display device is mounted on the head may be detected based on whether or not the headphone unit 21 presses the side of the head of the user.

There is a device called a cradle which can charge the battery 63 during the nonuse of the head-mounted display device.

Figure 11:
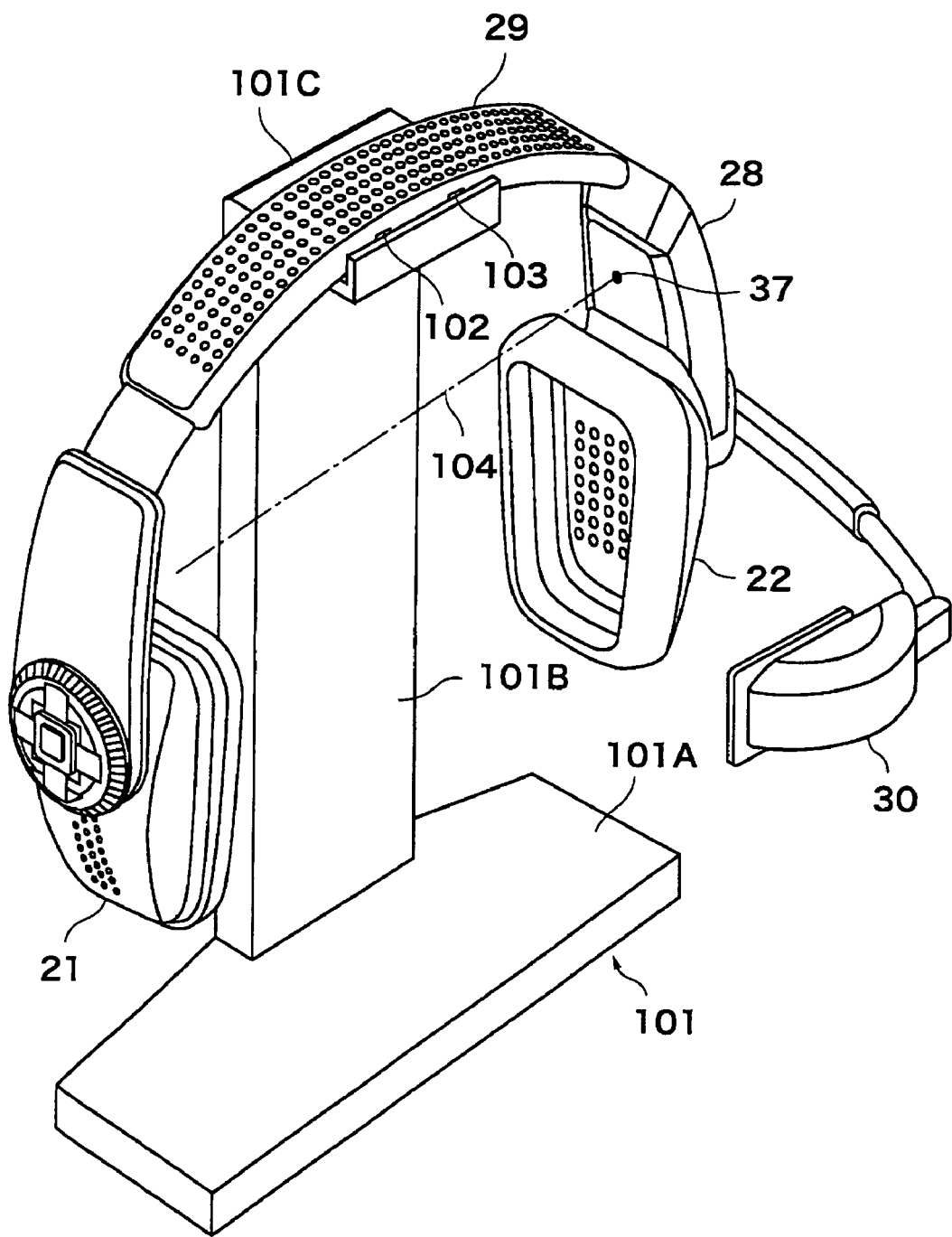
FIG. 11 is a perspective view showing a state in which the head-mounted display device is retained in a cradle.

FIG. 11 is a perspective view showing a state in which the head-mounted display device is retained in the cradle. A cradle 101 includes a base portion 101A, a vertical portion 101B, and a horizontal portion 101C. During the nonuse of the head-mounted display device, in the cradle 101, the head band unit 29 is hooked on the horizontal portion 101C to keep the head-mounted display device in a predetermined state. At this point, because an optical path 104 is not interrupted between the light-emitting unit 37 and light-receiving unit 38 (see FIG. 8) facing each other, the light-receiving unit 38 receives the light emitted from the light-emitting unit 37.

Charging terminals (not shown) are provided in the horizontal portion 101C so as to be able to be connected to power supply terminals 102 and 103 provided in the head band unit 29. The battery 63 of the head-mounted display device is charged through the charging terminals and the power supply terminals 102 and 103. The electric power is supplied to the cradle 101 from an external AC power supply (not shown). Accordingly, the battery 63 can securely be charged when the head-mounted display device is retained by the cradle 101.

Alternatively, a terminal (for example, USB terminal) except for the charging terminals may be provided, and information is fed through the terminal while the battery 63 is charged when the head-mounted display device is retained by the cradle 101.

Figure 12:
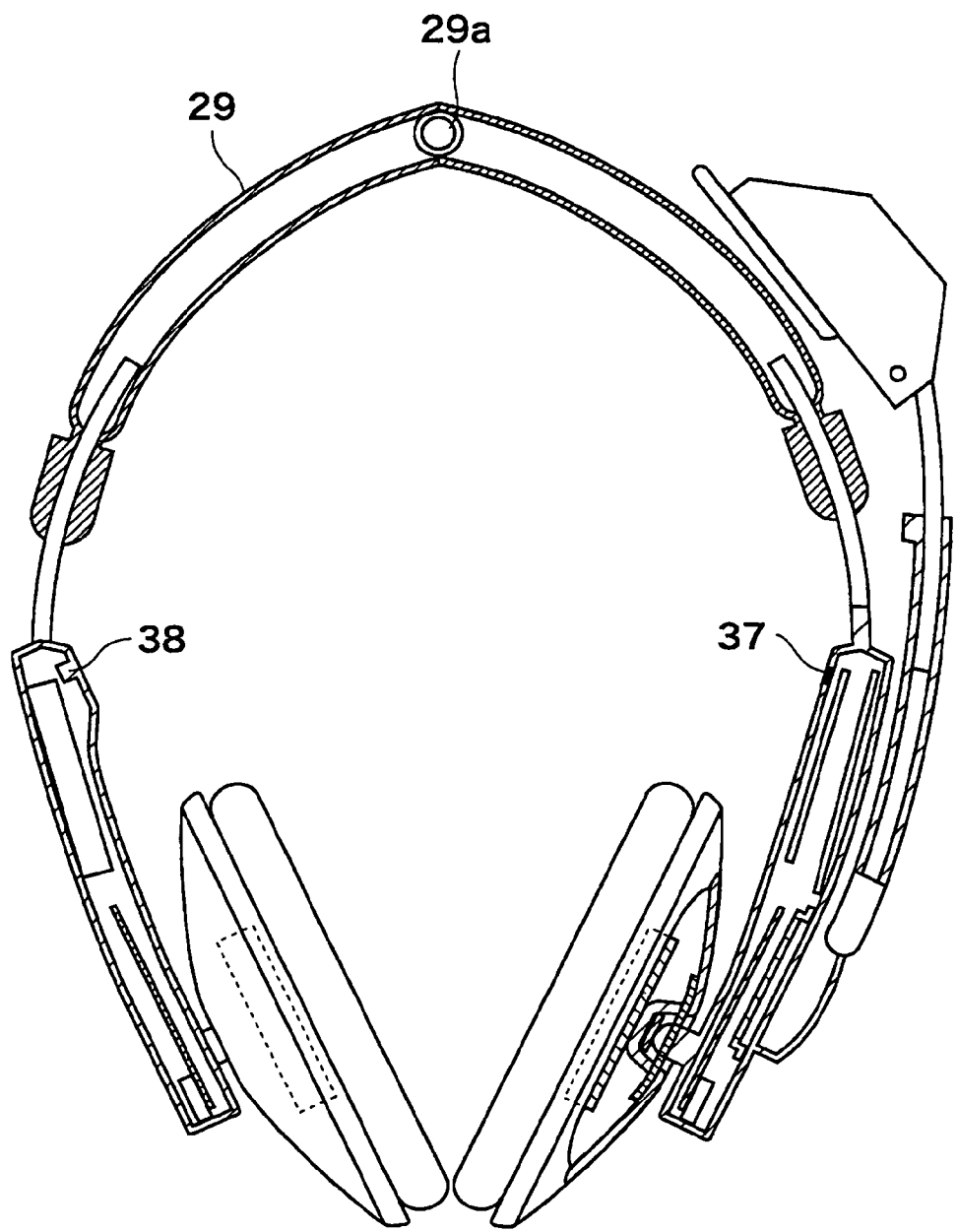
FIG. 12 is a longitudinal sectional view showing a head-mounted display device according to a ninth embodiment of the invention.

FIG. 12 is a longitudinal sectional view showing a head-mounted display device according to a ninth embodiment of the invention. The description is not repeated for the same portion as the eighth embodiment. In the head-mounted display device of the ninth embodiment, a hinge (bending member) 29a is provided in the center of the head band 29 in order to fold the head band 29 to compactly accommodate the head-mounted display device. FIG. 12 shows the state in which the head band 29 is folded. In the state of FIG. 12, the light-emitting unit 37 and the light-receiving unit 38 substantially opposite to each other, and the charging can also be performed.

The invention claimed is:

1. An output device which is mounted on a head to supply at least one of a video image and a sound, the output device comprising:
a rechargeable battery which has the output device operate;
a charging circuit which charges the battery;
a head mounting detector for detecting that the output device is mounted on the head;
at least two head fixing members which come in contact with the head to fix the output device to the head; and
a sandwich member which couples the two head fixing members and sandwiches the head between the head fixing members to fix the output device to the head with a biasing force of the sandwich member, wherein:
the output device has a function of stopping the charging circuit from charging the battery while the head mounting detector detects that the output device is mounted on the head, and
the head mounting detector detects that the output device is mounted on the head based on an opening angle of the sandwich member.

2. An output device which is mounted on a head to supply at least one of a video image and a sound, the output device comprising:
a rechargeable battery which has the output device operate;
a charging circuit which charges the battery;
a head mounting detector for detecting that the output device is mounted on the head;
at least two head fixing members which come in contact with the head to fix the output device to the head; and
a sandwich member which couples the two head fixing members and sandwiches the head between the head fixing members to fix the output device to the head with a biasing force of the sandwich member, wherein:
the output device has a function of stopping the charging circuit from charging the battery while the head mounting detector detects that the output device is mounted on the head,
the head fixing member and the sandwich member are connected by a turning unit or a link mechanism, and
the head mounting detector detects that the output device is mounted on the head based on an angle of the turning unit or the link mechanism.

3. An output device which is mounted on a head to supply at least one of a video image and a sound, the output device comprising:
a rechargeable battery which has the output device operate;
a charging circuit which charges the battery;
a head mounting detector for detecting that the output device is mounted on the head;
at least two head fixing members which come in contact with the head to fix the output device to the head; and
a sandwich member which couples the two head fixing members and sandwiches the head between the head fixing members to fix the output device to the head with a biasing force of the sandwich member, wherein:
the output device has a function of stopping the charging circuit from charging the battery while the head mounting detector detects that the output device is mounted on the head,
the head fixing members have a structure in which the head fixing members do not come in contact with each other when the output device is not mounted on the head, and
the head mounting detector includes a sensor which detects that one of the head fixing members comes in contact with the head, and the head mounting detector detects that the output device is mounted on the head based on an output of the sensor.

4. An output device which is mounted on a head to supply at least one of a video image and a sound, the output device comprising:
a rechargeable battery which has the output device operate;
a charging circuit which charges the battery;
a head mounting detector for detecting that the output device is mounted on the head;
at least two head fixing members which come in contact with the head to fix the output device to the head; and
a sandwich member which couples the two head fixing members and sandwiches the head between the head fixing members to fix the output device to the head with a biasing force of the sandwich member,
wherein the sandwich member includes:
a first member which comes in contact with a top of the head in mounting the output device on the head;
two second members which are slidably connected to one of side surfaces or both the side surfaces of the sandwich member to retain the head fixing member; and
the head mounting detector detects that the output device is mounted on the head based on distances between the first member and second members,
wherein the output device has a function of stopping the charging circuit from charging the battery while the head mounting detector detects that the output device is mounted on the head.

5. An output device which is mounted on a head to supply at least one of a video image and a sound, the output device comprising:
a rechargeable battery which has the output device operate;
a charging circuit which charges the battery; and
a head mounting detector for detecting that the output device is mounted on the head;
at least two head fixing members which come in contact with the head to fix the output device to the head; and
a sandwich member which couples the two head fixing members and sandwiches the head between the head fixing members to fix the output device to the head with a biasing force of the sandwich member, wherein:
wherein the output device has a function of stopping the charging circuit from charging the battery while the head mounting detector detects that the output device is mounted on the head,
the head fixing member or the sandwich member includes a illuminating unit and a light-receiving unit,
the illuminating unit and the light-receiving unit are disposed such that light does not reach the light-receiving unit from the illuminating unit when the output device is mounted on the head, and such that the light reaches the light-receiving unit from the illuminating unit when the output device is not mounted on the head, and
the head mounting detector detects that the output device is mounted on the head based on whether or not the light-receiving unit receives the light.

6. An output device which is mounted on a head to supply at least one of a video image and a sound, the output device comprising:
a light emitter which is provided near one of ears;
a light receiver which is provided near the other ear to be able to receive light from the light emitter;
a controller for determining whether or not the output device is mounted on a human body including the head based on an output of the light receiver;
first and second head contacts for sandwiching the head;
a coupler for coupling the first and second head contacts while biasing the first and second head contacts against the head; and
a bending member which folds the coupler,
wherein the light emitter and the light receiver are disposed such that the light emitted from the light emitter is incident to the light receiver irrespective of a bending state of the bending member.

7. An output device which is mounted on a head to supply at least one of a video image and a sound, the output device comprising:
a light emitter which is provided near one of ears;
a light receiver which is provided near the other ear to be able to receive light from the light emitter; and
a controller for determining whether or not the output device is mounted on a human body including the head based on an output of the light receiver,
wherein the light emitter and the light receiver are disposed substantially opposite to each other.

8. An output device which is mounted on a head to supply at least one of a video image and a sound, the output device comprising:
a light emitter which is provided near one of ears;
a light receiver which is provided near the other ear to be able to receive light from the light emitter; and
a controller for determining whether or not the output device is mounted on a human body including the head based on an output of the light receiver; and
a reflector for reflecting light from the light emitter to the light receiver.

9. An output device which is mounted on a head to supply at least one of a video image and a sound, the output device comprising:
a light emitter which is provided near one of ears;
a light receiver which is provided near the other ear to be able to receive light from the light emitter;
a controller for determining whether or not the output device is mounted on a human body including the head based on an output of the light receiver;
a rechargeable battery; and
a charger for charging the rechargeable battery,
wherein the controller causes the charger not to charge the rechargeable battery when determining that the output device is mounted on the human body including the head based on the output of the light receiver.

10. The output device according to claim 9, further comprising an external power supply which is connected to the charger to charge the rechargeable battery.

11. The output device according to claim 10, wherein the controller causes the charger to charge the rechargeable battery when the light receiver receives the light from the light emitter.

12. An output device which is mounted on a head to supply at least one of a video image and a sound, the output device comprising:
a coupler which is mounted on a top of the head of a user;
two undeformable coupling units which are coupled to both ends of the coupler, respectively;
two head contacts which are respectively connected to the two undeformable coupling units to press right and left sides of the head of the user;
light emitter which is provided in one of the two undeformable coupling units;
a light receiver which is provided in one of the two undeformable coupling units to be able to receive light from the light emitter; and a controller for determining whether or not the output device is mounted on a human body based on an output of the light-receiving means.

13. The output device according to claim 12, wherein the light emitter and the light receiver are disposed substantially opposite to each other.

14. The output device according to claim 12, further comprising a reflector for reflecting light from the light emitter to the light receiver.

15. The output device according to claim 12, wherein the controller determines whether or not the output device is mounted on the human body only when the external power supply is turned on.

16. An output device which is mounted on a head to supply at least one of a video image and a sound, the output device comprising:
   a light emitter which is provided near one of ears;
   a light receiver which is provided near the other ear to be able to receive light from the light emitter; and
   a controller for determining whether or not the output device is mounted on a human body including the head based on an output of the light receiver,
   wherein the controller determines whether or not the output device is mounted on the human body only when an external power supply is turned on.

17. An output device which is mounted on a head to supply at least one of a video image and a sound, the output device comprising:
   a detector for detecting a state in which the output device is mounted on a human body;
   a rechargeable battery;
   a charger for charting the rechargeable battery; and
   a controller for operating the output device with an electric power from an external power supply when the detector detects that the output device is mounted on the human body in supplying the electric power from the external power supply to the charger, and for causing the external power supply to charge the rechargeable battery when the detector does not detect that the output device is mounted on the human body,
   wherein the controller determines whether or not the output device is mounted on the human body only when the external power supply is turned on.

* * * * *